United States Patent
Averbuch (10) Patent No.: US 9,292,857 B2
(45) Date of Patent: Mar. 22, 2016

(54) ONE-CLICK EXCEPTIONS (75) Inventor: Jakob Averbuch, Netanya, IL (US)

(73) Assignee: Panorama Software Inc., New York, NY (US)

(*) Notice: Subject to any disclaimer, the term of this patent is extended or adjusted under 35 U.S.C. 154(b) by 445 days.

(21) Appl. No.: 12/926,510

(22) Filed: Nov. 23, 2010

(65) Prior Publication Data
US 2012/0131036 A1 May 24, 2012

(51) Int. Cl.
*G06F 17/30* (2006.01)
*G06Q 30/02* (2012.01)

(52) U.S. Cl.
CPC ........ *G06Q 30/0201* (2013.01); *G06F 17/3051* (2013.01); *G06F 17/30592* (2013.01)

(58) Field of Classification Search
USPC .................................................. 707/809, 769
See application file for complete search history.

(56) References Cited

U.S. PATENT DOCUMENTS

| 6,094,651 | A  | * | 7/2000 | Agrawal et al. |
| 7,536,413 | B1 | * | 5/2009 | Mohan et al. |
| 7,716,257 | B2 | * | 5/2010 | Thomson et al. ............. 707/809 |
| 2005/0288883 | A1 | * | 12/2005 | Folting et al. ................. 702/102 |

OTHER PUBLICATIONS

DB2 Cube Views A Primer, Sep. 2003, 760 pages.*

* cited by examiner

*Primary Examiner* — Albert Phillips, III (57) ABSTRACT

A method and system for automatically defining and applying an exception rule to reports created from at least one multi-dimensional database, comprising: defining global exception parameters, displaying at least one report created from a multi-dimensional database, receiving a user command to detect exceptional cells in the displayed report, locating the most relevant time dimension in the semantics of the source database of the report, detecting exceptional cells in the displayed report according to the exception parameters and the most relevant time dimension, calculating an exception quality for each detected exceptional cell, and indicating on the displayed report the exceptional cells, the indication comprising differentiating between different exception qualities, wherein the exception rule is independent of data granularity in the time dimension in the report.

11 Claims, 13 Drawing Sheets

AUTOMATIC ALERTS DEFINITION

Generate Automatic Alert On:

[X] All my private pages

[ ] My favorite pages

[ ] Public pages I can view

Schedule At:

( )

Whenever data is changed

ONE-CLICK EXCEPTIONS

FIELD OF THE INVENTION

The present invention relates generally to electronic business technology and business processes, and more particularly, to an automatic exception detection method and system.

BACKGROUND

The major purpose of OLAP is decision support. Users can gain insights into what is actually driving their business. They can measure effectiveness, maximize the ROI (return on investment) and thus maintain competitive advantage. OLAP is a key component to an organization's business intelligence infrastructure.

OLAP Servers make it easy to get summarized information. OLAP Servers aggregate data at build time and store these aggregations. Aggregations can use a number of different built-in OLAP statistics to aggregate data. Statistics are stored with OLAP cubes and do not require additional computation when accessed by queries. The short response times of OLAP data sources enable workers to navigate through data following their own train of thought. OLAP clients support the standard OLAP navigations such as:

Drilling up and down hierarchies.
Expanding and collapsing levels within hierarchies.
Slicing and dicing through data.
Drilling beyond the cube data into the underlying detailed data.

It is possible to begin exploring the data by getting a high-level overview on corporate operations. Based on this view, OLAP technology enables fast and consistent drill down access into the details that describe the accumulated business metrics in order to pinpoint key elements and to view business activities from a number of different perspectives. OLAP allows users to be able to analyze data across any dimension, at different levels of aggregation, with equal functionality and ease.

Within the business domain using OLAP technology, there are varying levels of sophistication. Some people use OLAP without actually knowing that it is OLAP, simply by opening up reports based on OLAP data and exploring one of the other dimensions by drilling up and down. At the other extreme, there are business analysts who use OLAP data sources as a launch pad to exploring multivariate problems, possibly applying statistical procedures or predictive models to specific slices of data taken from an OLAP data source. Reports using OLAP data are likely to be relevant for a large audience, while only a few people in an enterprise might be knowledgeable about statistical procedures or predictive analytics.

These experts define analysis rules to calculate performance metrics from detailed business transaction data, and context rules to enable performance metrics to be tied to business goals and forecasts. Some basic automation can be achieved by applying exception rules to metrics and sending an alert to a business user when a metric exceeds a threshold defined in the exception rule.

There is need for a tool that will enable the non-specialized user to define a powerful exception rule on his data, without having expert knowledge of the database structure and without the need to perform any programming.

SUMMARY

According to a first aspect of the present invention there is provided a computerized method of automatically defining and applying an exception rule to reports created from at least one multi-dimensional database, comprising: defining global exception parameters including at least: an exception threshold, a comparison rule, a comparison lag indicating the number of periods to go back for comparison and a comparison scope indicating which level of entities to compare; displaying on a computer monitor at least one report created from a multi-dimensional database, said at least one report comprising data cells and filters; receiving a user command to detect exceptional cells in said at least one displayed report; locating the most relevant time dimension in the semantics of the source database of said at least one report; detecting exceptional cells in said at least one displayed report according to said exception parameters and said most relevant time dimension; calculating an exception quality for each said detected exceptional cells; and indicating on said displayed report said detected exceptional cells, said indication comprising differentiating between different exception qualities, wherein said exception rule is independent of data granularity in said time dimension in said at least one report.

According to a second aspect of the present invention there is provided a computerized system for automatically defining and applying an exception rule to reports created from multi-dimensional databases, comprising: a system server comprising at least one multi-dimensional database and a server application; a plurality of client computers, each comprising a client application, a display monitor and GUI tools, said plurality of client computers communicating bi-directionally over the internet with said system server; said system application adapted to: locating the most relevant time dimension in the semantics of the source database of at least one report; detecting exceptional cells in said at least one report according to exception parameters and said most relevant time dimension; calculating an exception level for each said detected exceptional cells; and sending indications of said detected exceptional cells and said exception levels to said client application; and said client application adapted to: displaying said at least one report and marking said exceptional cells and said exception levels thereon, wherein said exception rule is independent of data granularity in said time dimension in said at least one report.

According to a third aspect of the present invention there is provided a computerized method of automatically defining and applying an exception rule to reports created from at least one multi-dimensional database, comprising: defining global exception parameters including at least: an exception threshold; a comparison rule; a comparison lag indicating the number of periods to go back for comparison; and a comparison scope indicating which level of entities to compare; receiving a user command for activating an exception detecting application upon fulfillment of at least one predefined criterion; receiving a user selection of at least one report page for applying said exception detection, each said at least one report pages comprising at least one report; and when said at least one predefined criterion is fulfilled: locating the most relevant time dimension in the semantics of the source database of the at least one report on said at least one report page; detecting exceptional cells in said at least one report according to said exception parameters and said most relevant time dimension; calculating an exception quality for each said detected exceptional cells; displaying said at least one report page; and indicating on said at least one displayed report said detected exceptional cells, said indication comprising differentiating between different exception qualities, wherein said exception rule is independent of data granularity in said time dimension in said at least one report.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

One click exception allows a non-specialized user to define a powerful exception rule pertaining to the time dimension on his data. The exception rule is independent of data granularity, i.e. it will apply rightly to the time dimension on any level.

One-click exception creates, for each cell in a report, a normalized percentage value that may be compared to the relevant entity.

The one-click exception rule as applied to the time dimension defines two important criteria that combine to determine if a data item is an exception and how it should be displayed:
1. Exception threshold (condition)
    a. The threshold value to cause an exception to happen.
    b. Can be defined as positive or negative value, to show exceptional values that are "good" or "bad".
    c. The condition for each cell is based on the growth of the cell value from the previous period. The system auto detects the relevant previous period based on:
        i. Auto detection of the most relevant time dimension from all the time dimensions existing in the cube.
        ii. Understanding the dimension semantics to do the right comparison for each cell, i.e. compare day against previous day, month against so previous month, year against previous year.
2. Exception quality
    a. How 'strong' is the exception. That is, two cells growth may be below 5% (the exception condition), but one is 20% below and the other is 60% below.
    b. The exception quality is normalized to a discrete range or 1-10, where 10 is the 'stronger' one.

The method of automatically detecting exceptions according to the present invention may work simultaneously on several different multi-dimensional data sources (OLAP cubes), comprising e.g. different time dimensions. For example, a warehouse database, in which the time dimension indicates times of goods inflow and outflow, and a sales database, in which the time dimension indicates time of sale.

Figure 1:
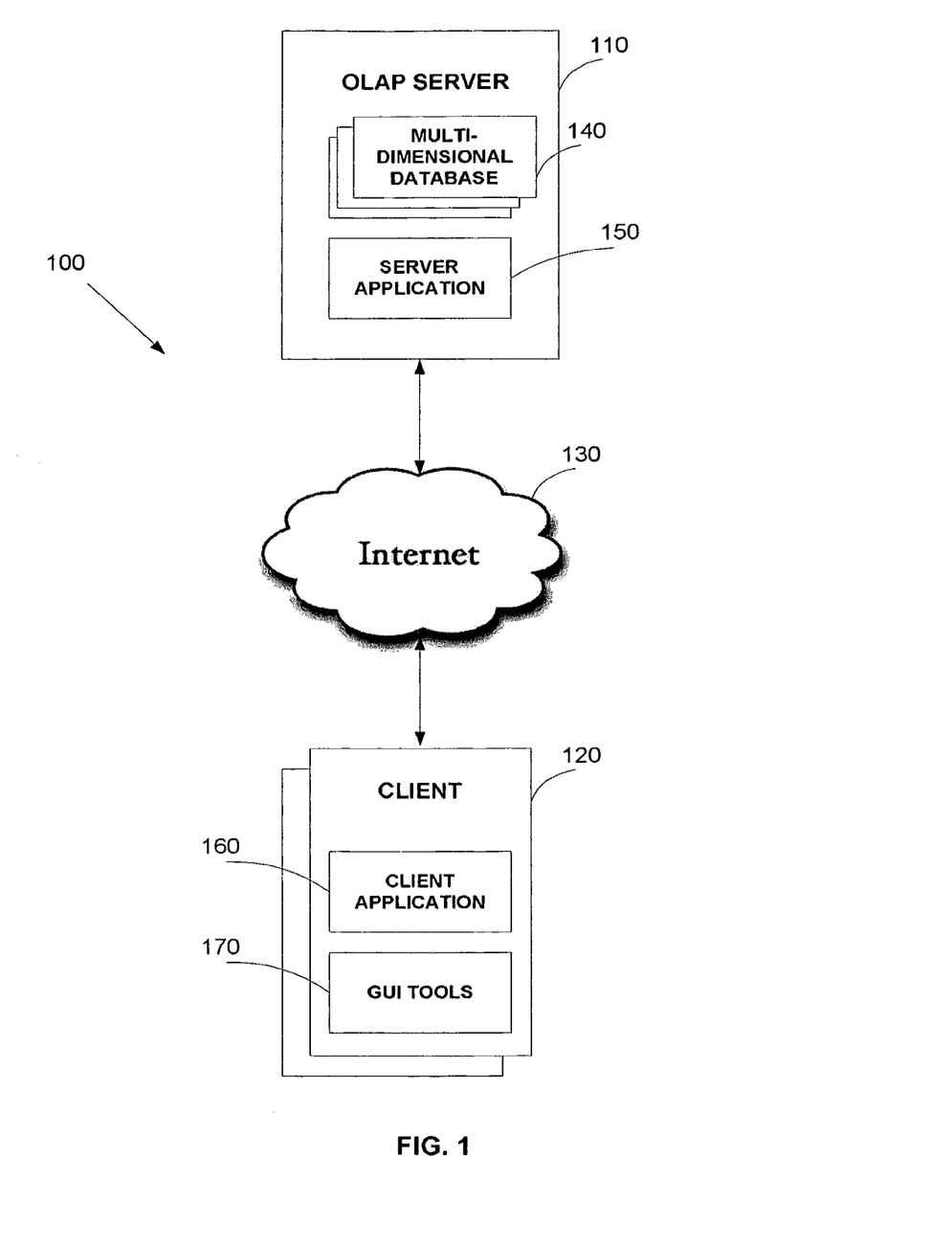
FIG. 1 is a schematic configuration of the system for carrying out the present invention.

FIG. 1 is a schematic configuration of the system for carrying out the present invention. The system 100 comprises an OLAP server 110 and a plurality of client computers 120 communicating bi-directionally with the server 110 over the Internet or Intranet 130.

The OLAP server 110 comprises at least one multi-dimensional database (OLAP cube) 140 and a server application 150.

Each client computer 120 comprises a client application 160 and GUI tools 170.

The method according to the present invention may work in one of two modes:
Interactive mode
Alerting/batch mode
Interactive Mode:

The interactive mode of defining, detecting and displaying exceptions operates on a set of N simultaneously displayed reports (crosstabs), derived from 1-N different OLAP cubes.

Figure 2:
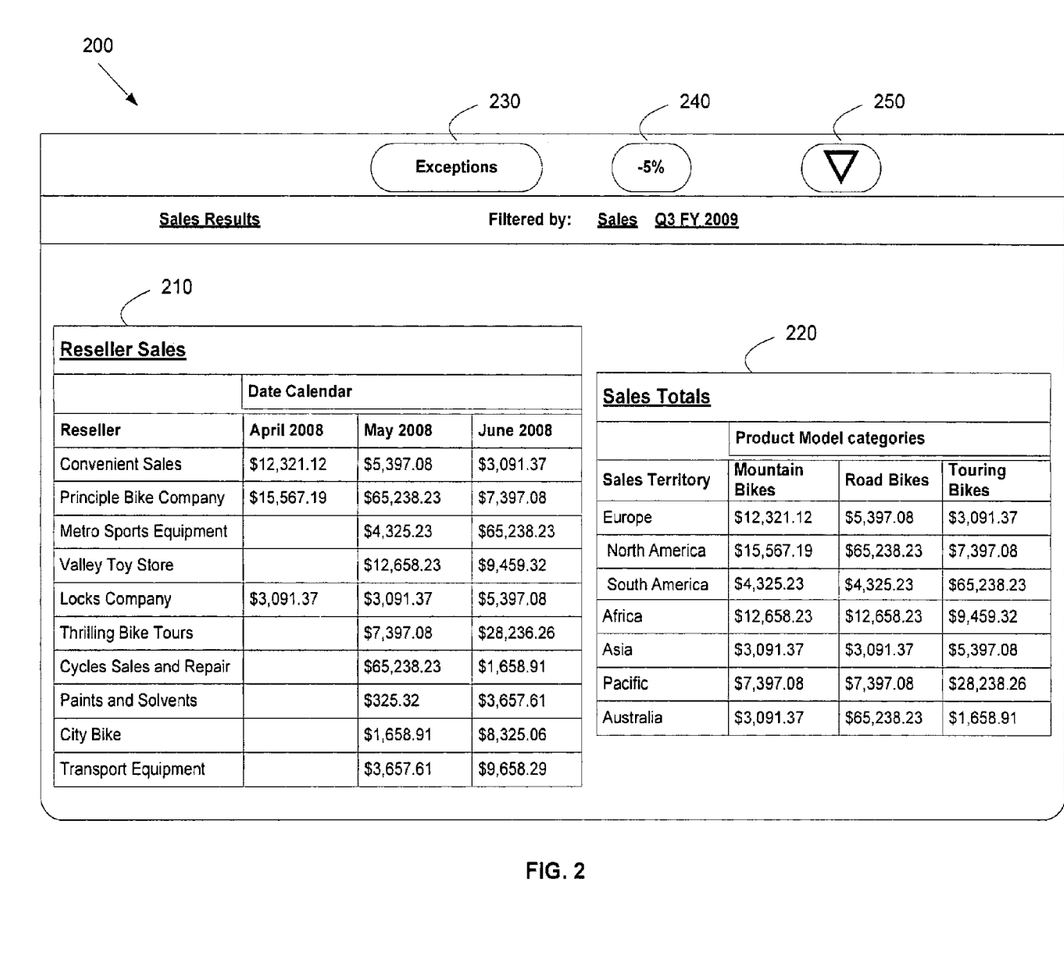
FIG. 2 shows an exemplary dashboard displaying two reports.

FIG. 2 shows an exemplary dashboard 200, displaying two reports, a Reseller Sales report 210, showing different resellers' $ sales for Apr. through Jun. of 2008 and Sales Total report 220, showing total $ sales for different product categories in different territories.

The reports are filtered by the "Sales" measure (pertaining to both reports) and by "Q3 FY 2009" (pertaining only to the Sales Total report).

The dashboard additionally comprises three GUI tools for operating and defining the one-click exceptions method, namely:
    An on/off "Exceptions" toggle button 230 for enabling and/or disabling automatic exceptions highlighting. A change in the button state will apply to all reports currently displayed.

A "Threshold Selection" tool 240 for defining the exception threshold. A change in the threshold level will affect the exception rule to show more/less cells highlighted and will apply to all reports currently displayed.
Threshold=–5 will show cells whose growth <5%
Threshold=5 will show cells whose growth >5%
The rule of comparison is defined as well, so user may select between "<","<=",">",">="

A "Filtering" tool 250 for defining the quality of exceptions to be displayed.

Figure 3:
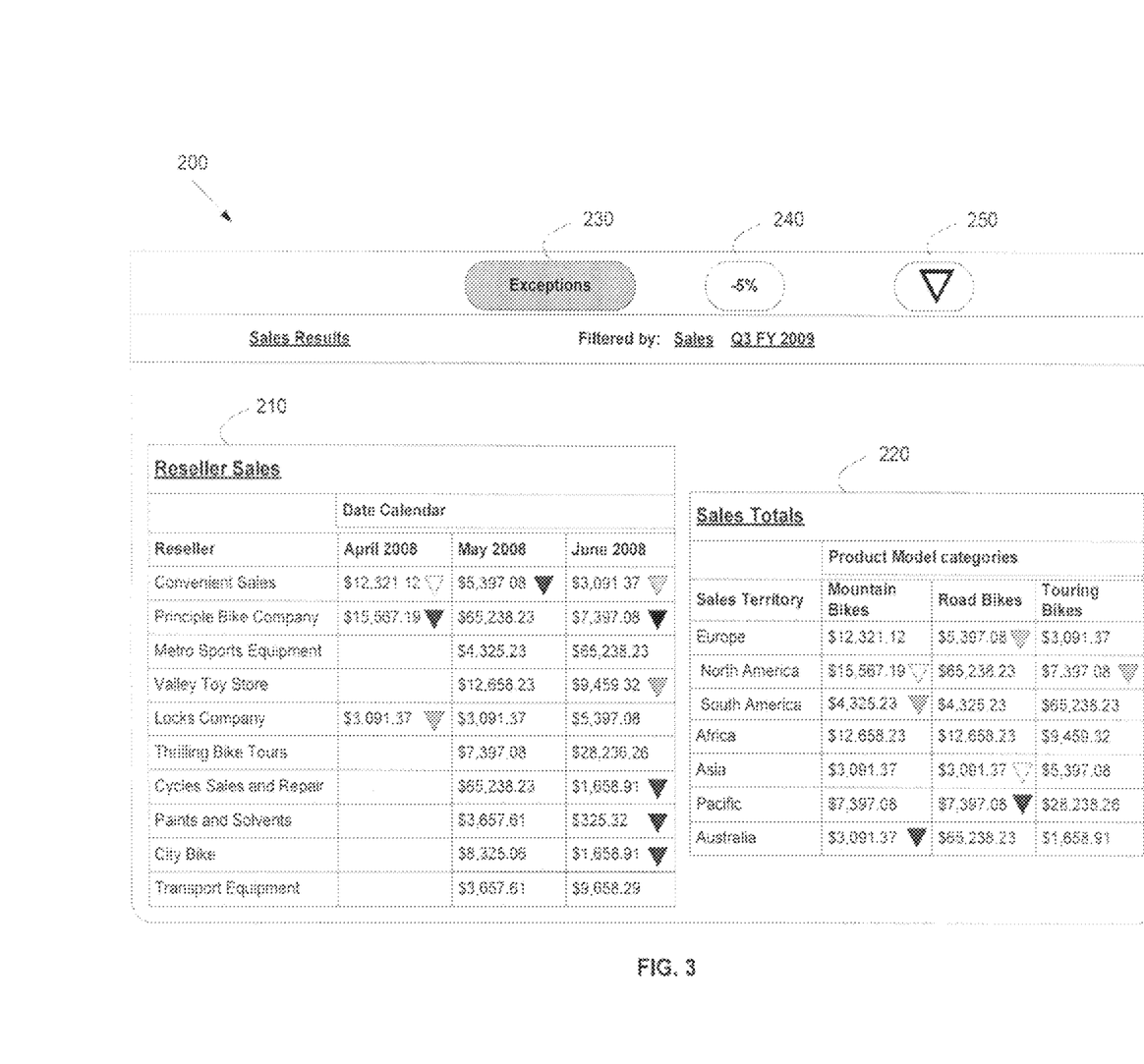
FIG. 3 shows the dashboard of FIG. 2, where the user has selected the "Exceptions" tool.

FIG. 3 shows the dashboard 200 of FIG. 2, where the user has selected the "Exceptions" tool 230 to view exceptional cells in the two displayed reports.

Figure 4:
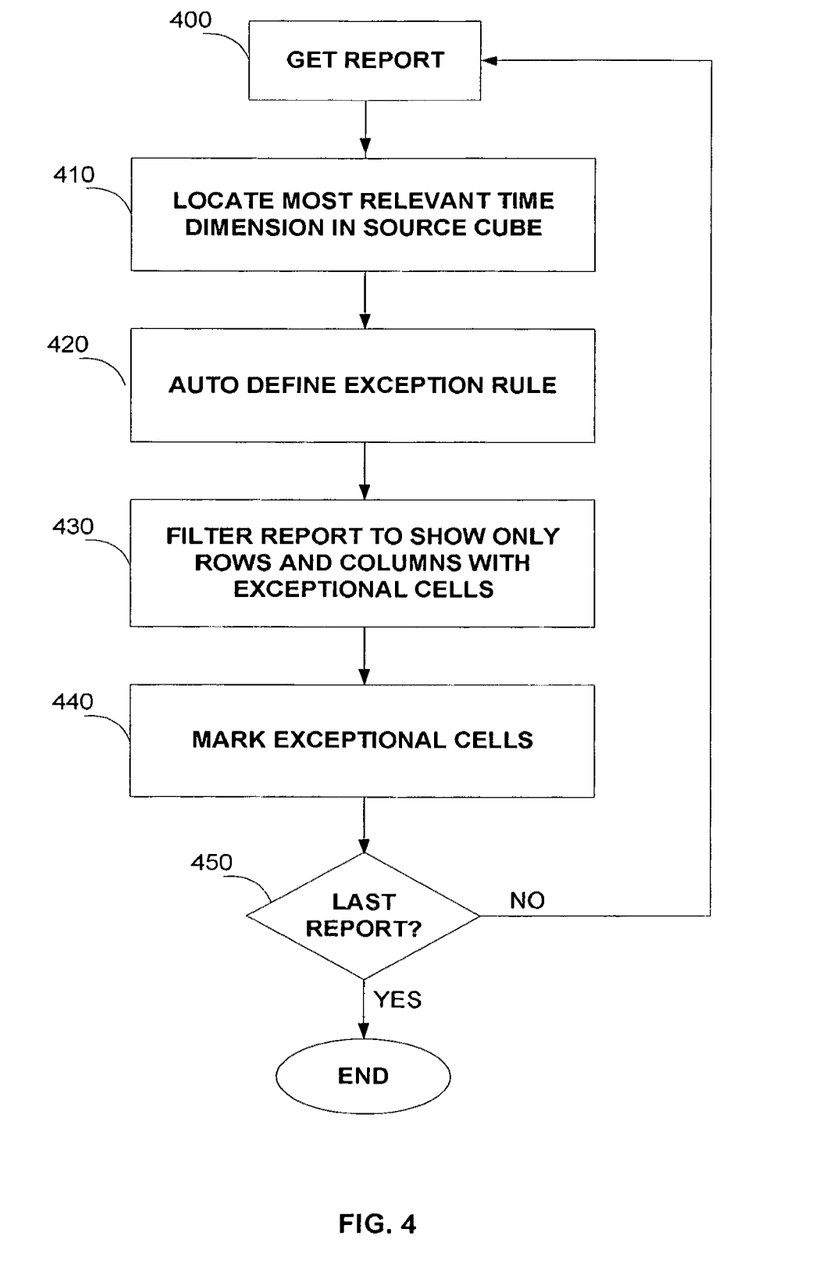
FIG. 4 is a flowchart showing the various steps taken by the server application when the user has requested to see the exceptions.

FIG. 4 is a flowchart showing the various steps taken by the server application when the user has requested to see the exceptions.

In step 400 the system starts iterations on all the displayed reports by getting the first report.

In step 410 locates the most relevant time dimension in the semantics of source cube of the report. Locating the most relevant time dimension is performed according to the following priority:
1. The time dimension on the X-axis of the report.
2. The time dimension on the Y-axis of the report.
3. The first time dimension on the filters (if there is more than one) that is sliced on a member (e.g. 2009) and not on "All Time".

Referring back to the example of FIG. 3, the time dimension selected for the "Reseller Sales" report will be "Month" (X-axis) and the time dimension selected for the "Sales Total" report will be "Quarters" (Filter).

In step 420 of FIG. 4, the system proceeds to automatically define the exception rule, according to several parameters, including but not limited to:
a. Exception threshold. A system default may be set at –5% and may be changed by the user (FIG. 6).
b. Comparison rule (<, <=, >, >=). A system default may be set as <= and may be changed by the user (FIG. 6).
c. Lag—How many periods to go back for comparisons. A system default may be set as 1 and may be changed by the user (not shown).
d. Scope—Which level of entities to compare. A system default may be set as 0 and may be changed by the user (not shown). Alternatively, a preferred scope may automatically be detected by the system (e.g. seasonal comparison), or be defined in the cube.

For example, if the time dimension has Year/Quarter/Month levels, Lag=1 and Scope=2, the system will determine the cell to compare to "January 2009" as follows:
1. UP two levels (Scope=2) to Year level→2009.
2. BACK one period (Lag=1)→2008.
3. BACK to the original cell level (Month)→January 2008.

In step 430 of FIG. 4, the system proceeds to filter out of the displayed reports rows and columns that have no exceptional cells and in step 440 the exceptional cells in the N displayed reports are marked.

Steps 410 through 440 are repeated for each displayed report.

Figure 5:
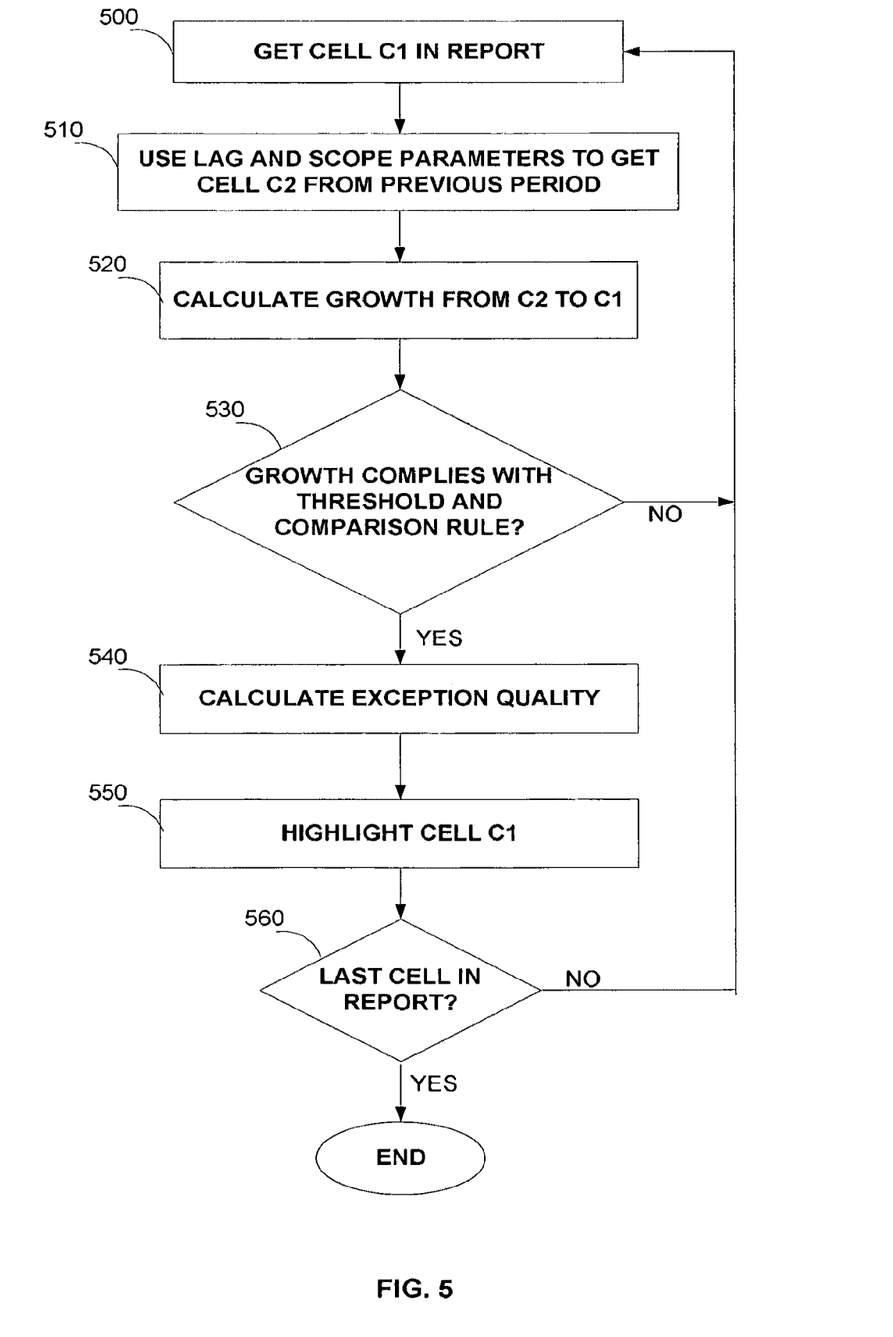
FIG. 5 is a flowchart showing the various steps involved in determining for each cell in a report whether it is exceptional.

FIG. 5 is a flowchart showing the various steps involved in determining for each cell in a report whether it is exceptional.

In step 500 the system starts iterations on all the cells of the report by getting the first cell C1.

In step 510 the Lag and Scope parameters are used to determine which cell C2 is to be compared with cell C1, as explained above.

In step 520 the growth rate from C2 to C1 is calculated, namely $((C1-C2)/C2)$ and in step 530 the calculated growth rate is compared with the Threshold and Comparison rules, to determine whether the growth rate complies with the exception rule. If it is determined that the growth rate complies with the exception rule, the system proceeds to calculate the quality of the exception (step 540), as will be explained in detail below. In step 550 cell C1 is highlighted accordingly.

Steps 510 through 550 are repeated for each cell in the report.

An exception quality (strength) may be calculated using various known in the art statistical computations. A preferred but not limiting method of calculating the exception quality according to the present invention is:
1. For all exceptional cells for each measure find the highest (Mx) and lowest (Mn) growth values:
   a. If the crosstab shows comparable values, e.g. only sales values, then we need to find two values, highest and lowest, of all the crosstab.
   b. If the crosstab shows cell values for multiple measures, e.g. Sales, Cost, Profit, then we calculate the max\min value for each measure separately, since the distributions of the various measures may be different.
2. Define B buckets, where each bucket defines a strength level of exceptions.
3. Assign each exceptional cell to a bucket, thus defining its strength level.

The buckets' definition may be done in one of two ways:
a. Equal sized buckets:
   According to this method, the buckets will define equal scopes of growth (e.g. 0-9%, 10-19%, etc.) but will have different number of members:
   1. Define cell(i) growth as G(i).
   2. The bucket assigned to cell(i) will be: $B(i)=B*(G(i)-Mn)/(Mx-Mn)$.
b. Weighted buckets:
   According to this method, the buckets will define different scopes of growth but will have an equal number of members:
   1. Define an array (Arr A) of size S(A) in which the exceptional cells are ordered from low to high growth rate.
   2. Rank each cell in the array: $X(i)=rank(Arr\ A, cell(i))$
   3. The bucket assigned to cell(i) will be: $B(i)=int(B*X(i)/S(A))+1$ The resulting exception quality for each cell may be indicated on the displayed using different GUI methods. For example, each exceptional cell may be displayed with an up/down triangle denoting positive/negative exception respectively. The up/down triangle color shows the quality of the exception. Different shades of green (positive) or red (negative) show quality, the darker, the stronger the exception quality is.

Figure 6:
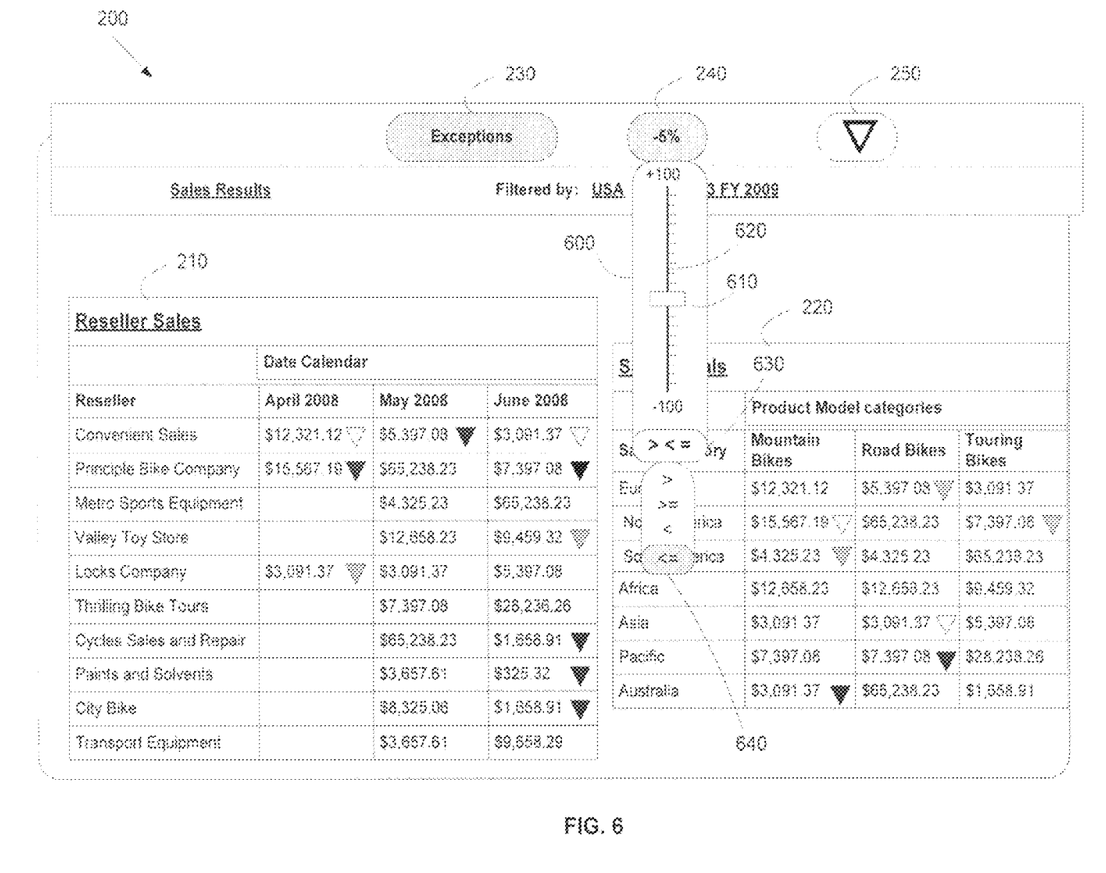
FIG. 6 shows the example of FIG. 2, on which the automatic exception display has been performed using a default 5% threshold.

FIG. 6 shows the example of FIG. 2, on which the automatic exception display has been performed using a default 5% threshold.

The user may now open a threshold changing slider drop-down 600 by clicking the "Threshold Selection" tool 240. The threshold level may be changed using a slider 610 sliding over a numbers (percents) scale ranging from –100 to 100. A change in the slider drop-down will apply to all the currently displayed reports, provided the exceptions are activated.

A Comparison Rule selection tool 630 may also be implemented as a slider drop-down 640.

Figure 7:
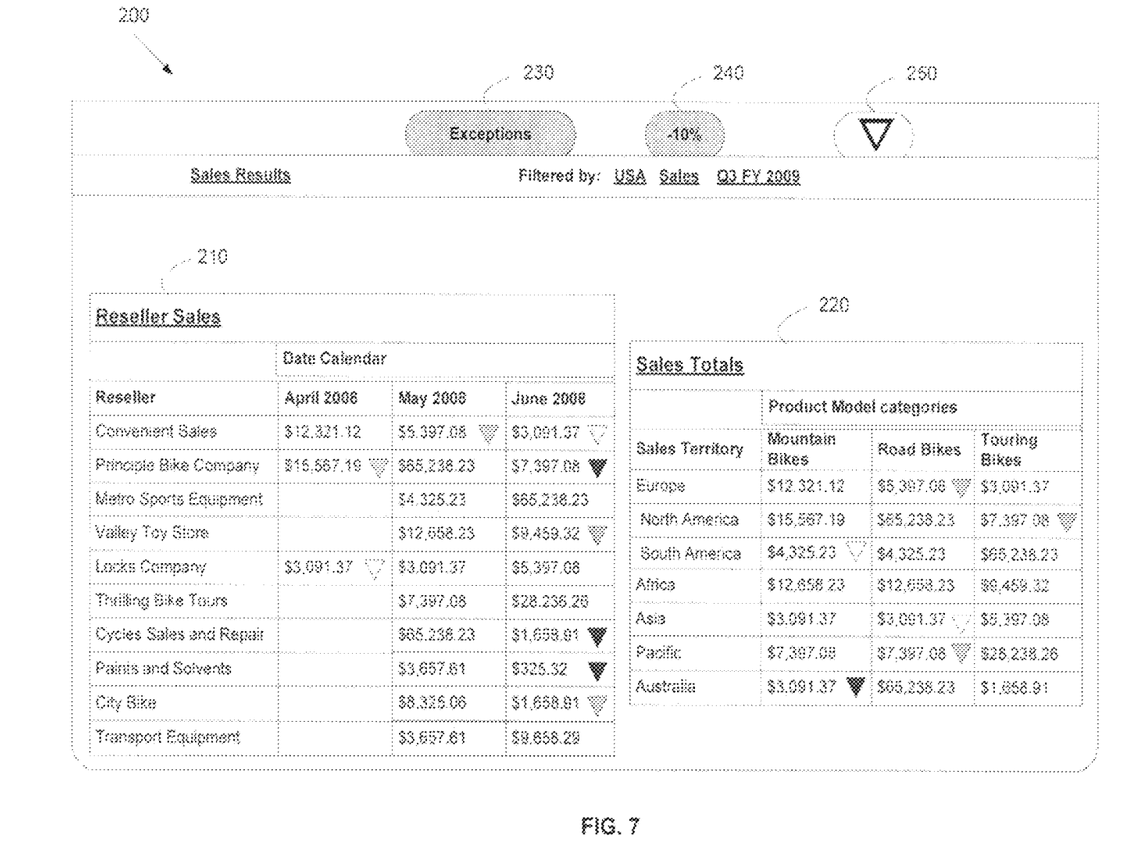
FIG. 7 shows the updated reports.

In the example of FIG. 6, the user selects –10% to be the new exception threshold and a <= comparison rule, resulting in the updated reports displayed in FIG. 7. As can be seen, some of the exceptional cells from FIG. 6 are no longer indicated as exceptions (e.g. Convenient Sales for April 2008), while other cells have changed their exception level (e.g. Road Bikes sales for the Pacific territory).

Figure 8:
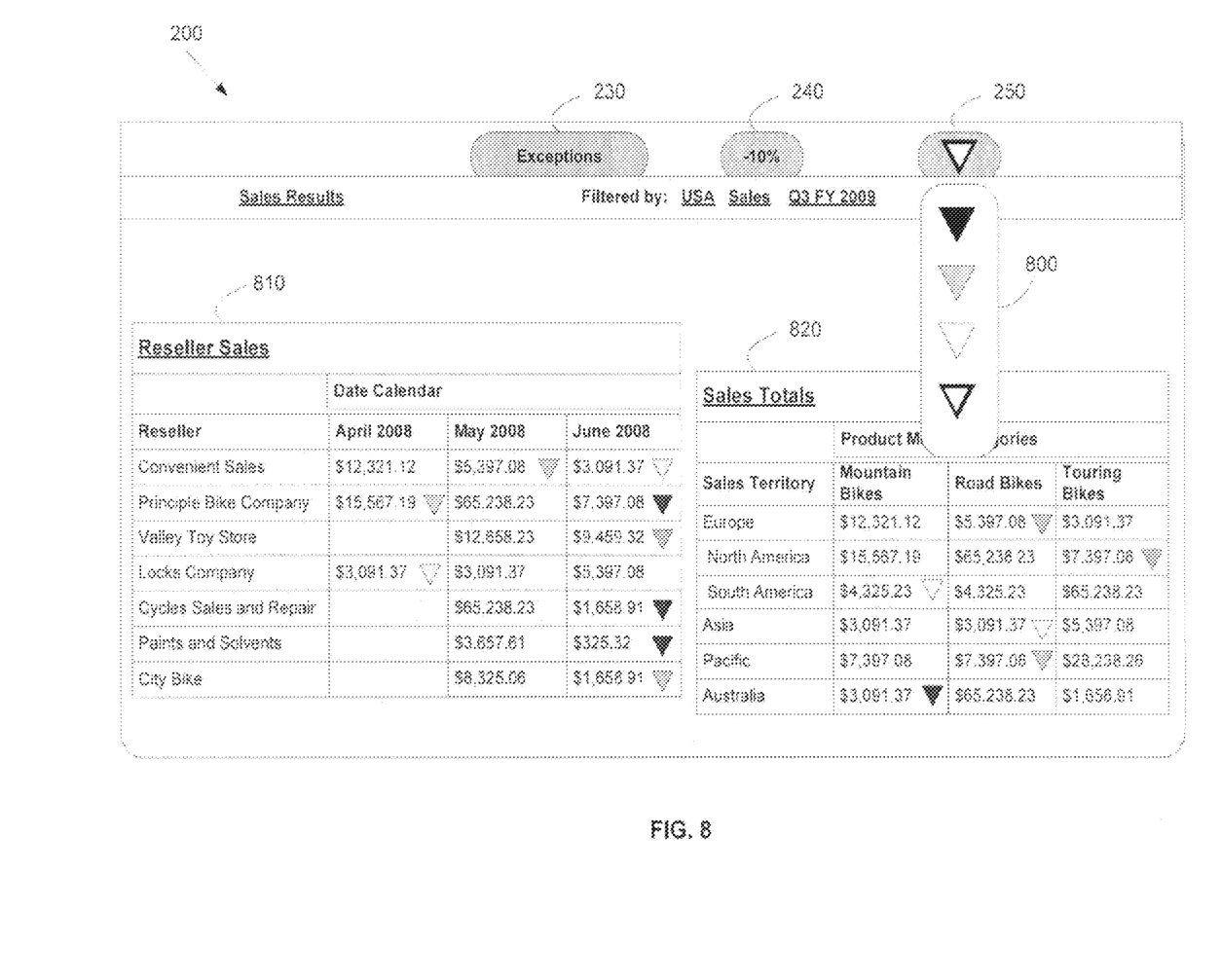
FIG. 8 shows a drop-down menu for selecting the exception levels to be displayed.

FIG. 8 shows a drop-down menu 800 for selecting the exception levels to be displayed, by clicking the Filtering tool 250. The user may select one or more exception levels to be displayed, or he may chose to display All levels, as indicated by the current choice in the example. Selecting a different exception level will cause all triangles indicating other levels to disappear from display.

In FIG. 8, the Reseller Sales report 810 and the Sales Total report 820 only show rows and columns having exceptional cells according to the current parameter selection.

Figure 9:
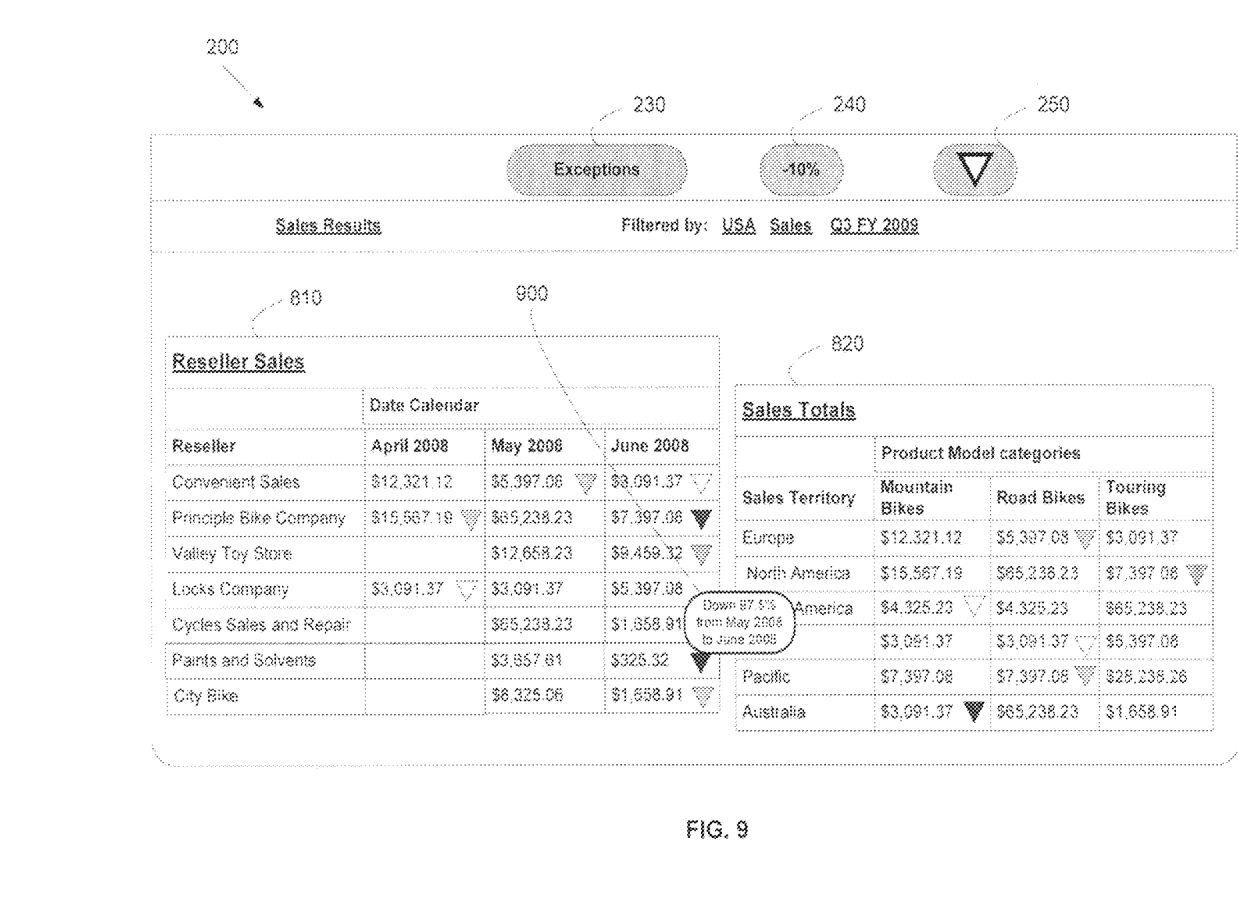
FIG. 9 shows an additional GUI tool showing detailed growth data pertaining to the cell the user's cursor hovers over.

FIG. 9 shows an additional GUI tool 900, in the shape of a balloon showing detailed growth data pertaining to the cell the user's cursor hovers over.

Alerting/Batch Mode:

The Alerting mode of defining, detecting and displaying exceptions operates on a choice of the user's pages, each comprising at least one report, at times defined by the user. Default values may be configured in the system for the various exception rule parameters, or previously defined parameters may be used.

Figure 10:
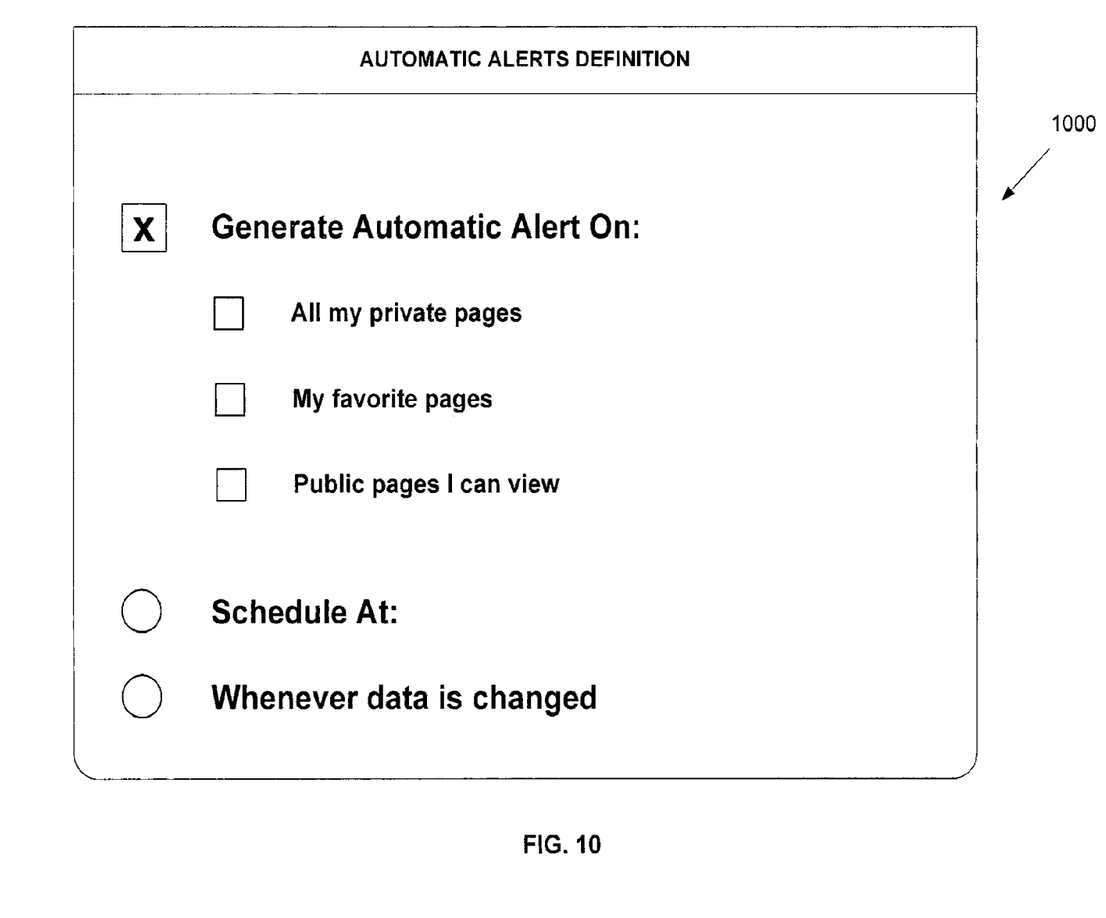
FIG. 10 shows an exemplary GUI for defining automatic exception alerts.

FIG. 10 shows an exemplary GUI 1000 for defining automatic exception alerts.

The user may select the pages which should be analyzed for automatic exception alert, e.g. "All my private pages", "My favorite pages", "Public pages I can view".

The user may also define when the automatic exception analysis and alert should take place, e.g. "Scheduled at . . . " (e.g. $1^{st}$ of each month, every Monday, etc.) or "Whenever data is changed", i.e. whenever data pertaining to one of the selected pages is changed in the database.

Figure 11:
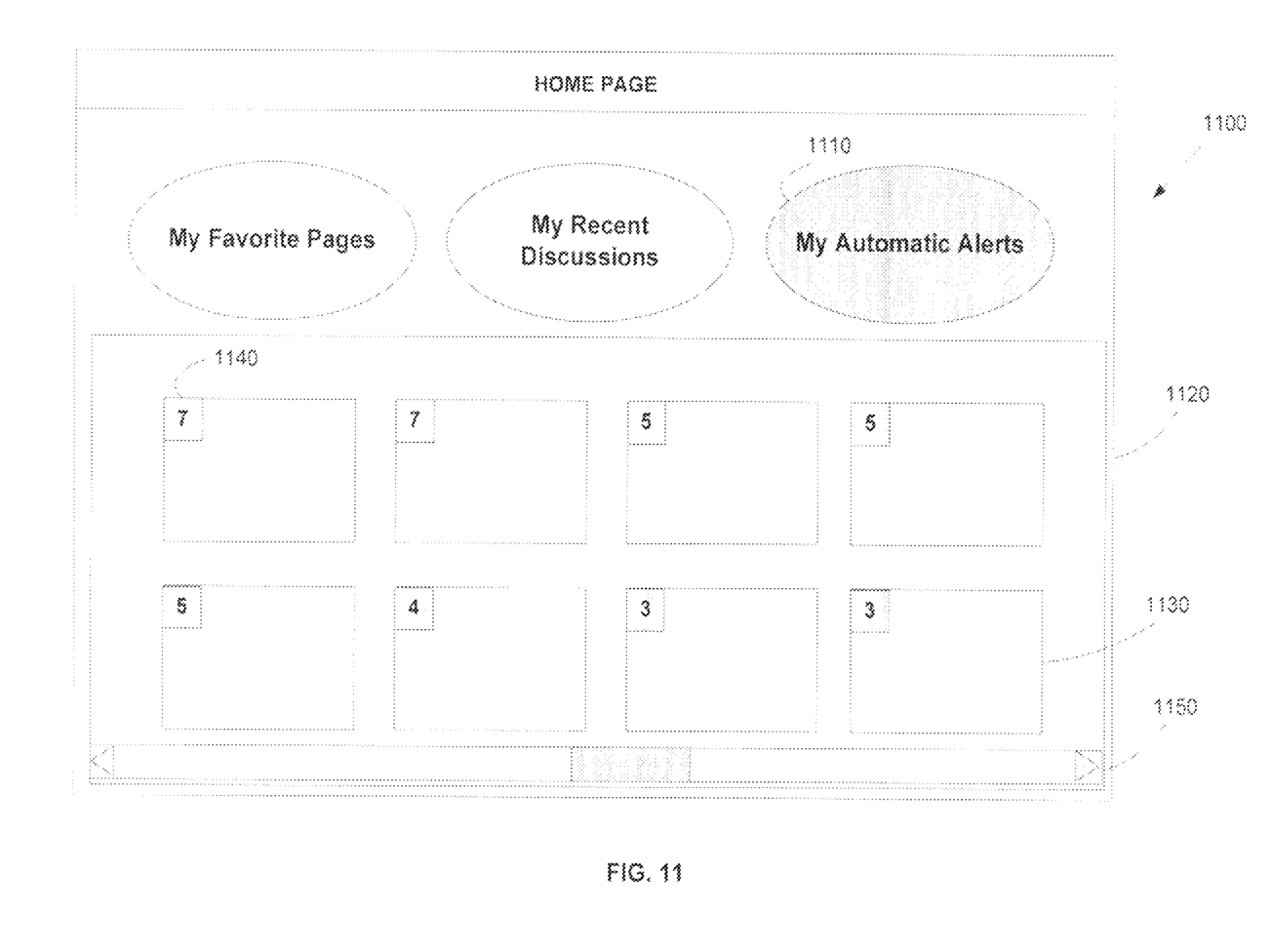
FIG. 11 shows an exemplary GUI for self-initiating the automatic exception alerts.

The user may additionally or alternatively self-initiate the defined batch of alerts, as shown in FIG. 11, by selecting a toggle button 1110 in his displayed home page 1100.

Figure 12:
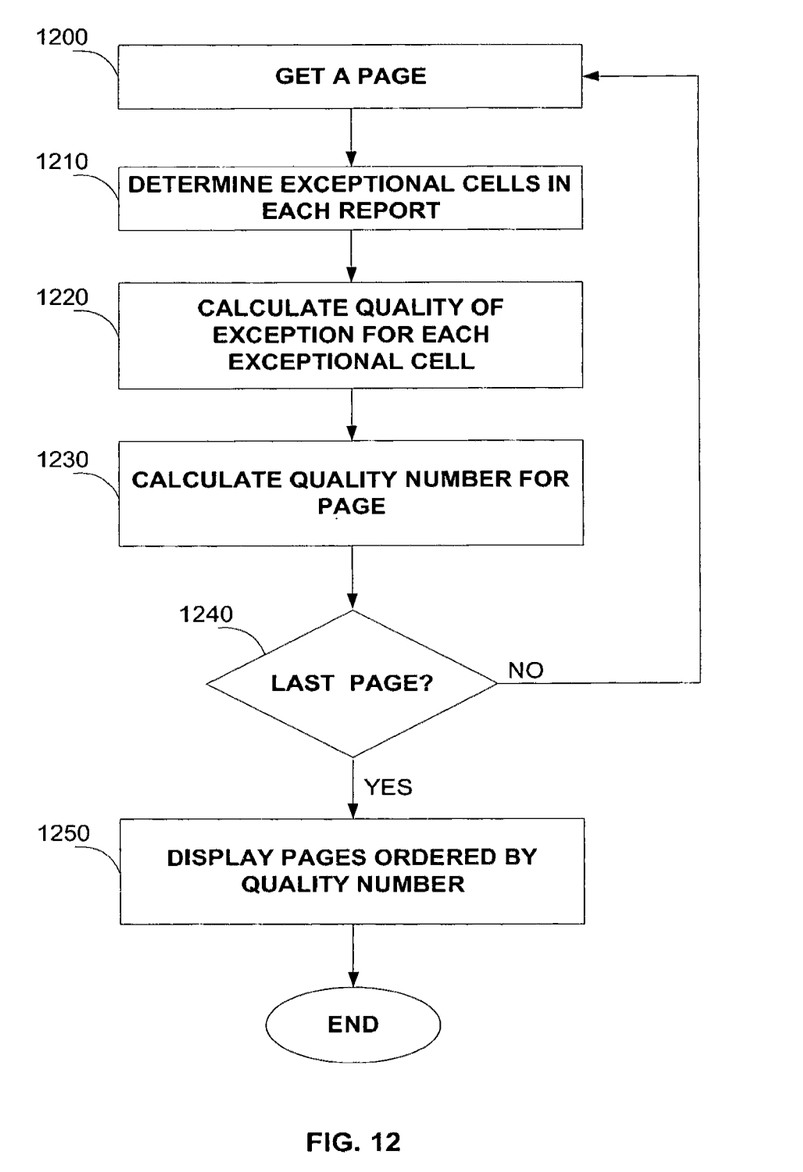
FIG. 12 is a flowchart showing the various steps taken by the system when batch mode alerting is initiated.

FIG. 12 is a flowchart showing the various steps taken by the system when batch mode alerting is initiated, either automatically or on-demand.

In step 1200 the system gets the first relevant page, as defined by the user in conjunction with FIG. 10, and uses the exception parameters, either default or previously defined by the user, to determine which cells in the report(s) are exceptional (step 1210).

In step 1220 the system calculates, for each report, for each exceptional cell, the exception quality, as described above and in step 1230 a Report Quality number is calculated for the report, to indicate the overall severity of the exceptions in the report.

The Report Quality number may be calculated using various known in the art statistical computations. A preferred but not limiting formula of calculating the Report Quality number according to the present invention is:
   i. Cnum=number of cells in report
   ii. Ci=an exceptional cell
   iii. Qi=the quality of Ci exception
   iv. M−report quality
      M=sum(Qi)Cnum M results in the average exception quality per report cell.

The Page Quality number may be calculated using various known in the art statistical computations from the Report quality numbers A preferred but not limiting formula of calculating the Page Quality number according to the present invention is
   1. Summary of report quality of all reports.
   2. Average of report quality (sum or report quality/number of reports in page).

Steps 1200 through 1230 are performed for each page.

In step 1250, the pages are displayed, preferably as thumbnails, in a descending order of page quality.

Referring back to FIG. 11, the user's homepage GUI comprises a window 1120 in which thumbnail pages 1130 are displayed according to descending order of pages quality. The pages Quality number 1140 for each page may be displayed with the thumbnail. Window 1120 may comprise a scroll-bar 1150, to enable scrolling through the thumbnail page. Clicking one of the thumbnail pages will cause the full page to be displayed.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof which would occur to persons skilled in the art upon reading the foregoing description.

Figure 13:
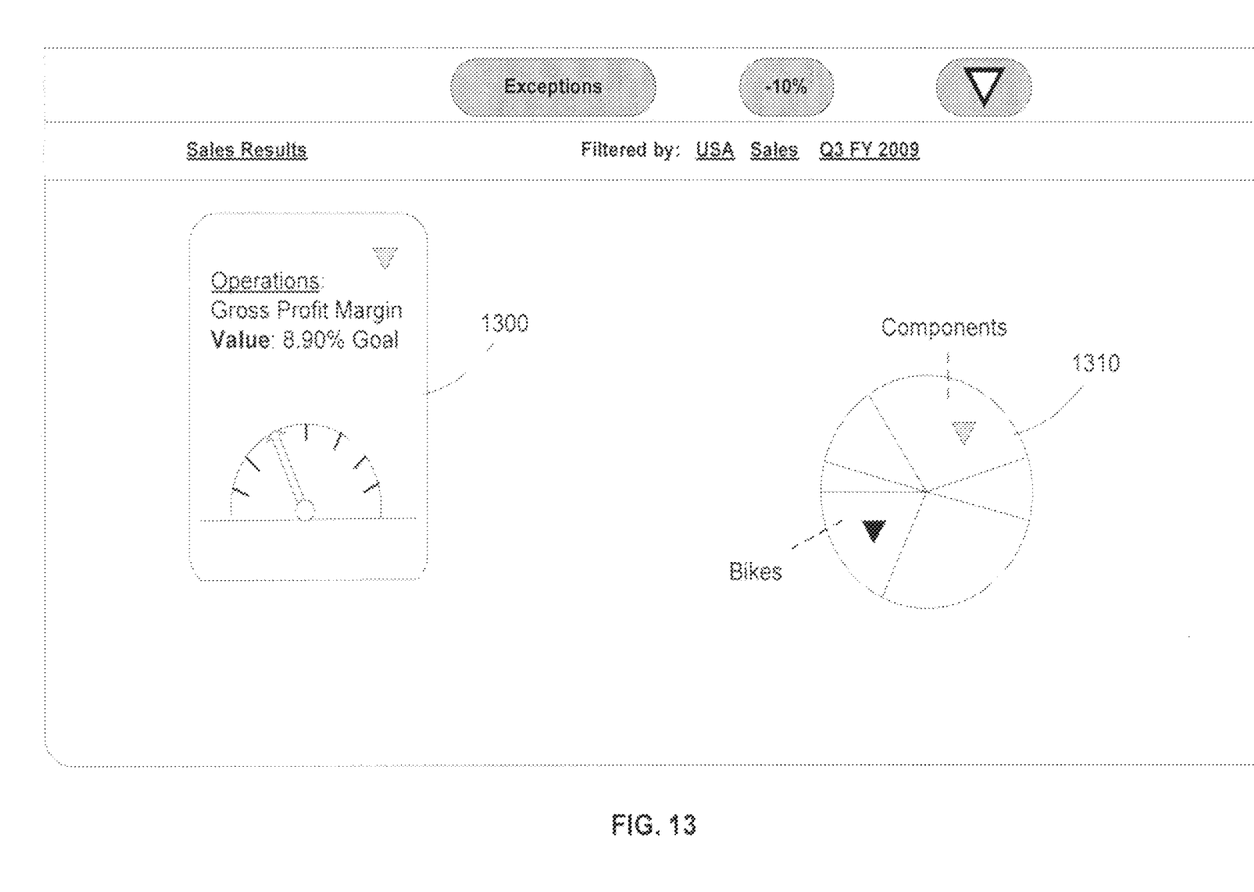
FIG. 13 shows examples of applying the method of the present invention to other visualizations that are based on one or more data cells.

For example, as shown schematically in FIG. 13, the method of the present invention may be similarly applied to any visualization that is based on one or more data cells, e.g. KPIs 1300, pie-charts 1310, etc.

The invention claimed is:

1. A computerized method of automatically identifying and calculating time-dependent exceptions in a plurality of reports, the method comprising:
   analyzing a plurality of reports where each report of said plurality of reports is created from one of a plurality of multi-dimensional databases, each report of said plurality of reports is comprising a plurality of cells arranged in rows and columns;
   performing a comparison between each cell of said plurality of cells and a respective cell in at least one respective reference report from a previous period selected by:
      identifying a word semantically representing a time period along a time dimension of said each report. thereby locating said time dimension, wherein said time dimension is one of a plurality of dimensions of said plurality of multi-dimensional databases, and
      locating said respective cell using said time dimension in said respective reference report,
      wherein said comparison is performed by calculating a relative percentage change between said each cell and said respective cell;
   detecting a plurality of exceptional cells in the plurality of reports based on said relative percentage change exceeding a predefined threshold;
   calculating an exception quality value using a first statistical computation for each one of said plurality of detected exceptional cells;
   calculating a report quality value using a second statistical computation for each one of the plurality of reports based on said calculated exception qualities; and
   sending, for presentation on a user interface, said exception quality value and said report quality value for at least some of said plurality of reports.

2. The method of claim 1, wherein performing a comparison comprises selecting said respective time dimension according to the following priority: the time dimension on the X-axis of the respective report, the time dimension on the Y-axis of the respective report, and the first time dimension that appears on a filters dimension list, that is filtered on said time period.

3. The method of claim 1, wherein said performing a comparison comprises:
defining global exception parameters including at least:
an exception threshold;
a comparison rule;
a comparison lag indicating the number of periods to go back for comparison; and
a comparison scope indicating which level of entities to compare; wherein said detecting said plurality of exceptional cells in said plurality of reports is performed according to said exception parameters.

4. The method of claim 3, wherein said global exception threshold comprises percentage.

5. The method of claim 3, wherein said comparison rule is selected from the group consisting of: greater than, greater or equal to, smaller then and smaller or equal to.

6. The method of claim 3, wherein detecting exceptional cells comprises, for each first cell, using the lag and scope parameters to get the appropriate second cell from a previous period and calculating the growth from said second cell to said first cell.

7. The method of claim 1, wherein said plurality of reports are selected by a user, additionally comprising receiving a user command for activating said method of automatically identifying and calculating time-dependent exceptions on said plurality of reports upon fulfillment of at least one predefined criterion; and
wherein said detecting comprises applying an exception rule to each cell of said plurality of reports according to said selected time dimension when said at least one predefined criterion is fulfilled.

8. The method of claim 7, wherein said at least one predefined criterion is selected from the group consisting of times scheduled by the user and data changes in at least one of said plurality of reports selected by a user.

9. The method of claim 1, wherein said calculating an exception quality value comprises:
a. finding the highest (Mx) and lowest (Mn) growth values for all exceptional cells for each measure of the report;
b. defining B buckets, where each bucket defines a quality level value of exceptions; and
c. assigning each exceptional cell to one of said buckets.

10. The method of claim 9, wherein each bucket defines equal scopes of growth.

11. The method of claim 9, wherein each bucket contains an equal number of members.

* * * * *